United States Patent [19]

van Leeuwen

[11] Patent Number: 4,665,434
[45] Date of Patent: May 12, 1987

[54] METHOD AND APPARATUS FOR GENERATING A S.E.C.A.M. MODULATING SIGNAL

[75] Inventor: Antonie van Leeuwen, Eindhoven, Netherlands

[73] Assignee: U.S. Philips Corporation, New York, N.Y.

[21] Appl. No.: 718,051

[22] Filed: Mar. 29, 1985

[30] Foreign Application Priority Data

Apr. 9, 1984 [NL] Netherlands ................... 8401115

[51] Int. Cl.$^4$ ........................................... H04N 9/65
[52] U.S. Cl. ................................................ 358/25
[58] Field of Search ................................ 358/23, 25

[56] References Cited
U.S. PATENT DOCUMENTS
3,984,863 10/1976 Fessard ................................. 358/25

FOREIGN PATENT DOCUMENTS
89728 9/1983 European Pat. Off. .
2048610 12/1980 United Kingdom ................. 358/23

Primary Examiner—James J. Groody
Assistant Examiner—Robert Michael Bauer
Attorney, Agent, or Firm—Thomas A. Briody; Jack Oisher; William J. Streeter

[57] ABSTRACT

In an encoding circuit for the S.E.C.A.M. color television standard a signal value is added to each one of two line-sequential color difference signals to determine the quiescent frequencies. The modulating signal containing the color difference signals is subjected to double sided amplitude limitation. The ratio of the level difference between the limitation limits to the difference between the added signal values is substantially constant. The signal path for the modulating signal to the FM-oscillator comprises a controllable amplifier, limitation being effected first followed by amplification.

7 Claims, 2 Drawing Figures

METHOD AND APPARATUS FOR GENERATING A S.E.C.A.M. MODULATING SIGNAL

The invention relates to a method of generating a modulating signal in an encoding circuit which signal is applied to a modulation input terminal of an oscillator generating a frequency-modulated signal in accordance with the S.E.C.A.M. colour television standard. To each one of two line-sequential colour difference signals a respective first and second signal value, is added which after modulation corresponds to the relevant quiescent frequency. The modulating signal containing these two colour difference signals is subjected to double sided amplitude limiting with an upper limit corresponding to a first extreme frequency, and a lower limit corresponding to a second extreme frequency of the frequency-modulated signal.

Such a method is disclosed in German Patent Specification No. 3,013,166. Therein, the modulating signal is amplified and thereafter the amplified signal is limited between the upper and lower limits which determine the swing of the frequency-modulated signal. As these amplitude limits must be determined very accurately, said patent specification describes two control circuits for controlling these limits and consequently the extreme frequencies of the frequency-modulated signal generated by the oscillator.

SUMMARY OF THE INVENTION

The invention has for its object to provide a simplification of the prior art method, more specifically in such a way that said control circuits may be omitted, whilst the desired accuracy of the frequency swing is still maintained. For that purpose, the method according to the invention is characterized in that the ratio of the difference in level between the upper and lower limits determined by the limitation, to the difference between the first and second signal values added to the colour difference signals is made substantially constant. The difference in level between a limit and a signal value is given a value which, after modulation, corresponds to the difference between the relevant extreme frequency and the relevant quiescent frequency.

The invention is based on the recognition that the quiescent frequencies are accurately fixed, for example by means of a control, so that the use of the invention also results in the upper and lower limits of the limitation being fixed. Acting thus, all the frequencies of the frequency-modulated signal generated by the oscillator are fixed.

It is a further the invention that the modulating signal is amplified before it is applied to the modulation input terminal of the oscillator. The modulating signal is preferably limited first, the limited signal being thereafter amplified with a controllable gain. Because of the amplification, the difference between the first and the second signal values may not remain constant and it will be obvious that the difference between the limits of the limiter must be locked to the amplification factor.

The invention also relates to an encoding circuit for use with the above-defined method. Herein, the signal path for the modulating signal to the modulation-input terminal of the oscillator comprises a limiting circuit for effecting the double sided amplitude limitation. The encoding circuit may then be characterized as a limiting circuit which comprises first, second and third voltage sources, the first voltage source determining the level difference between the upper and lower limits fixed by the limitation, the second voltage source determining the difference between the first and second signal values added to the colour difference signals, whilst the third voltage source determines the level difference between a limit and a signal value. The ratio of the voltage of the first source to the voltage of the second source is substantially constant and the ratio of the voltage of the first source to the voltage of the third source is substantially constant.

Advantageously, the encoding circuit is further characterized in that the first, second and third voltage sources are constituted by first, second and third resistors through which currents having substantially the same values flow.

In that case the encoding circuit includes a limiting circuit which comprises a first amplifier for amplifying one colour difference signal and a second amplifier for amplifying the other colour difference signal, the outputs of the two amplifiers being interconnected. The limiting circuit further comprises a first limiter for fixing the upper limit at these outputs and a second limiter for fixing the lower limit, one terminal of the first resistor being coupled to the first limiter and the other terminal to the second limiter. One terminal of the second resistor is coupled to an input terminal of the first amplifier for determining the direct current setting of this amplifier thus determining the first signal value, whilst the other terminal of the second resistor is coupled to an input terminal of the second amplifier for determining the direct current setting of this amplifier thus determining the second signal value. One terminal of the third resistor is coupled to the second limiter and the other terminal to the input terminal of the first amplifier.

DESCRIPTION OF THE FIGURES

The invention will now be described in greater detail by way of example with reference to the accompanying Figures.

DESCRIPTION OF THE PREFERRED EMBODIMENT

Figure 1:
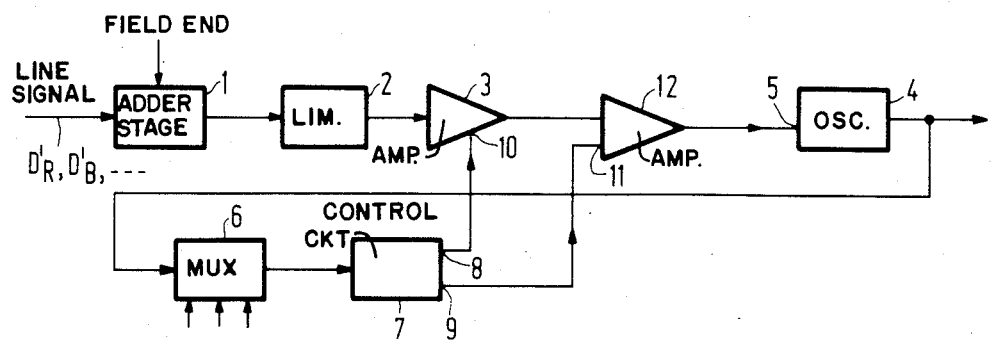
FIG. 1 shows a block circuit diagram of a portion of an encoding circuit according to the invention.

In FIG. 1, reference numeral 1 represents an adder stage to which the colour difference signal for red $D'_R$, and the colour difference signal for blue $D'_B$, are alternately applied. In preceding stages this line-sequential signal was subjected to operations in accordance with the S.E.C.A.M standard. Stage 1 also receives a field identification signal which occurs during the field blanking interval. The signal at the output of stage 1 is limited by means of an amplitude-limiting circuit 2 and the limited signal is amplified with the aid of a controllable amplifier 3. The output of amplifier 3 is connected to the modulation-input terminal 5 of an oscillator 4 via an amplifier 12. Oscillator 4 generates a frequency-modulated signal which is further processed in a known manner to obtain a S.E.C.A.M. colour television signal. This signal is also applied to a multiplexer 6 to which also a plurality of other signals are applied. The action of multiplexer 6 ensures that the input signals thereof occur in a predetermined sequence at the output of the multiplexer. These signals are applied to a control circuit 7 having two outputs 8 and 9. Control voltages are present at these outputs. Multiplexer 6 and control circuit 7 are described in detail in published European Patent Application No. 89728 (PHN 10306), corresponding to U.S. Pat. No. 4,577,217 filed by Applicants and is included herein by reference.

The control voltages generated by control circuit 7 ensure that the frequency of the frequency-modulated signal is equal to the quiescent frequency for red $f_{OR}=4.40625$ MHz during the red lines in time intervals, more specifically the line blanking intervals, in which signal $D'_R$ is zero and to the quiescent frequency for blue $f_{OB}=4.250$ MHz during the blue lines in time intervals, more specifically the line blanking intervals, in which signal $D'_B$ is zero. For this purpose the control voltage present at output 8 is applied in known manner to a terminal 10 of amplifier 3 for controlling the gain thereof, whilst the control voltage present at output 9 is applied to a terminal 11 of amplifier 12 for controlling the d.c. setting thereof. In this way the required accuracy is obtained for the quiescent frequencies, and the other frequencies are fixed accurately.

Figure 2:
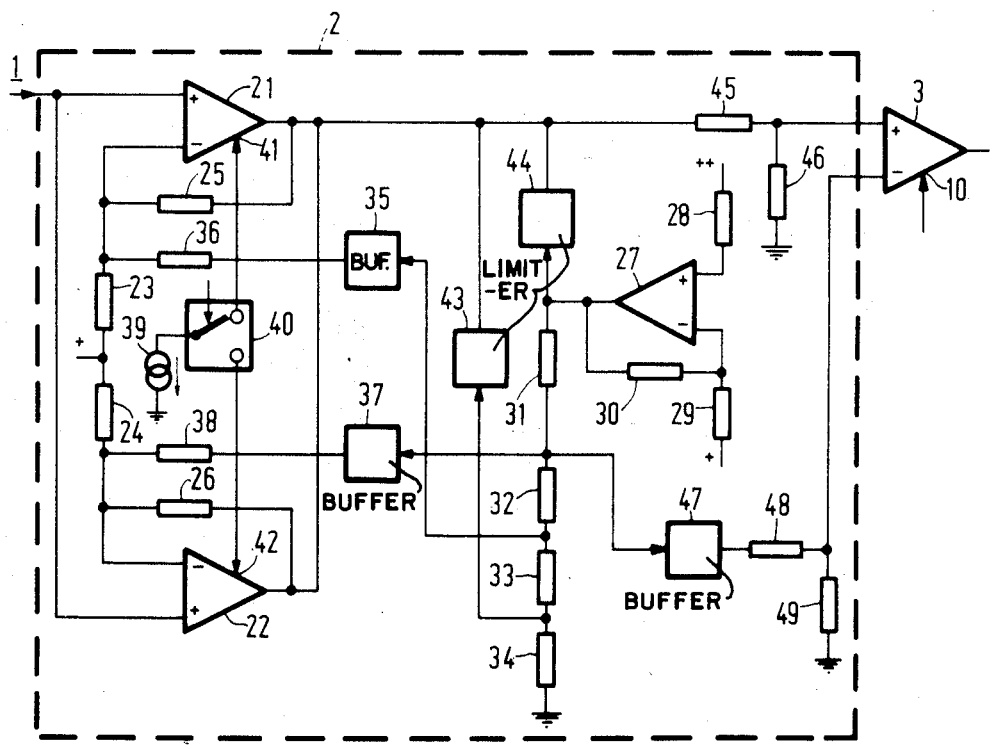
FIG. 2 shows a more detailed circuit diagram of a limiting circuit which forms part of the encoding circuit shown in FIG. 1.

With the aid of limiting circuit 2 the extreme frequencies generated by oscillator 4 are accurately determined, namely $f_1=3.900$ MHz and $f_2=4.75625$ MHz. FIG. 2 shows a circuit diagram of circuit 2. The input of circuit 2 connected to adder stage 1 is connected to the non-inverting input terminal of an amplifier 21 and to the non-inverting input terminal of an amplifier 22. The inverting input terminal of amplifier 21 is connected to a reference voltage via a resistor 23. Similarly, the inverting input terminal of amplifier 22 is connected to the reference voltage via a resistor 24. The output terminal of each amplifier is connected to its inverting input terminal via negative feedback resistors 25 and 26, respectively and both output terminals are interconnected. The circuit comprises a third amplifier 27 whose non-inverting input terminal is connected to a reference voltage via a resistor 28 and whose inverting input terminal is connected to a lower voltage via a resistor 29 and to the output terminal via a negative feedback resistor 30. Four resistors 31, 32, 33 and 34 are connected in series between the output terminal of amplifier 27 and ground. The junction between resistors 32 and 33 is connected to the inverting input terminal of amplifier 21 via a buffer stage 35 and a resistor 36. Similarly, the junction between resistors 31 and 32 is connected to the inverting input terminal of amplifier 22 via a buffer stage 37 and a resistor 38. A current source 39 can be connected via a switching stage 40 to either a terminal 41 of amplifier 21 or to a terminal 42 of amplifier 22 for making the relevant amplifier operative.

Switching stage 40 is operated by a signal of half the line frequency, causing amplifier 21 to be operative during the red lines and amplifier 22 during the blue lines. Amplifier 27 is a direct current amplifier. A current which causes a voltage drop across each of them flows through resistors 31, 32, 33 and 34. Buffer stages 35 and 37, which are, for example emitter follower stages, serve as voltage sources for determining the direct current setting of amplifiers 21 and 22. A line-sequential signal whose direct current level is in this way determined separately for the red and the blue lines is present across the interconnected output terminals of these amplifiers. Two limiters 43 and 44 are connected to these output terminals. Limiter 43, which is of a known construction, is connected to the junction between resistors 33 and 34. Limiter 43 does not influence the output signal of amplifiers 21 and 22 given the understanding that in the absence of the limiter, this signal does not fall below a predetermined value determined by the voltage at said junction, which is, for example, equal thereto, otherwise the signal is limited to this value. Similarly, limiter 44, which is also of a known construction is connected to the output terminal of amplifier 27. Limiter 44 has no influence on the output signal of amplifiers 21 and 22 with the proviso that in the absence of the limiter, this signal does not exceed a predetermined value determined by the voltage at the said terminal, which is, for example, equal thereto, in which case the signal is limited to this value. The output signal whose lower limit is determined by limiter 43 and the upper limit by limiter 44, is applied to the non-inverting input terminal of the controllable amplifier 3, via a resistance voltage divider 45, 46. The junction between resistors 31 and 32 is connected to the inverting input terminal of amplifier 3 via a buffer stage 47 and a voltage divider 48, 49, which is equal to voltage divider 45, 46. The d.c. setting of amplifier 3 is determined with the aid of voltage dividers 45, 46 and 48, 49.

From the foregoing it will be obvious that both the d.c. setting of amplifiers 21 and 22 and the limit values fixed by limiters 43 and 44 are determined by the voltages across different points of the voltage divider formed by resistors 31, 32, 33 and 34. These voltages have been chosen so that the control voltages applied to terminals 10 and 11 are such that circuit 2 alternately produces the signal values which, after modulation, result in the quiescent frequencies $f_{OR}$ and $f_{OB}$ while the limit values, correspond to the extreme values $f_1$ and $f_2$ of the frequency swing. If, for example, the colour difference signals do not contain colour information, then the modulating signal applied to terminal 5 is a square-wave signal of half the line frequency. During a red line the signal at the output of oscillator 4 has the frequency $f_{OR}$ and during a blue line it has the frequency $f_{OB}$.

From the foregoing it will also be obvious that the difference between the d.c. settings of amplifiers 21 and 22 is determined by the voltage drop across resistor 32. After modulation, this difference corresponds to the difference between the quiescent frequencies, i.e. 156.25 kHz. Similarly, the maximum possible difference in amplitude of the output signal of circuit 2, that is to say the difference between the limit values determined by the limiters 43 and 44, is determined by the voltage drop across series resistors 31, 32 and 33. After modulation, this difference corresponds to the difference between the frequencies $f_2$ and $f_1$, i.e. 856.25 kHz. In this situation the currents flowing to the buffer stages 35, 37 and 47 and to limiters 43 and 44 are assumed to be so small as to be disregarded, compared with the current flowing through resistors 31, 32, 33 and 34. It was found that the ratio between the difference of the two amplitudes considered, and therefore in the frequency modulated signal, the ratio of the frequency swing to the difference between the quiescent frequencies, which is nominally 856.25/156.28, is determined by the ratio of the voltage across a resistor to the voltage across a different resistor. This ratio is proportional to the ratio between two resistance values, namely the ratio of the sum of the values of resistors 31, 32 and 33 to the value of resistor 32. Particularly when the described circuit, at least the relevant portion thereof, forms part of an integrated circuit, a very high degree of accuracy can be obtained for this ratio. More specifically, this ratio changes very little with fluctuations in the supply voltages and/or the temperature. Consequently, in the signal applied to amplifier 3, the above-described ratio is fixed. In response to the control of the gain of amplifier 3 the amplitude of the modulating signal applied to terminal 5 may vary, but the ratio remains unimpaired. The same holds for the ratio of the values of resistor 33 or 31 to the sum of the values of resistors 31, 32 and 33, which ratio determines the location of an extreme frequency relative to a quiescent frequency. Since the quiescent frequencies resulting from the control voltages applied to the terminals 10 and 11 are fixed, the extreme frequencies of the frequency-modulated signal are consequently also fixed. It will be apparent from the foregoing that this result is obtained with relatively simple means, it being of fundamental importance that amplifiers 3 and 12 are located after limiting circuit 2. If they were located before these limiting circuits the conversion of the limit levels to the extreme frequencies would not be correct in the event of a varying gain.

It should be noted that in the foregoing only those portions of the encoding circuit are described which are important for the invention. The signal path for the modulating signal may comprise other components, for example filters.

What is claimed is:

1. A method for generating a signal for frequency modulating an oscillator, said oscillator producing a frequency modulated S.E.C.A.M. colour television signal comprising the steps of:
   adding to each one of two line sequential difference signals first and second signal values, respectively, which produce first and second quiescent frequencies from said oscillator when said difference signals are applied to a frequency modulation input of said oscillator;
   amplitude limiting said two line sequential colour difference signals to levels between a first upper level and a second lower level, corresponding to first and a second extreme frequency limits respectively, of said oscillator;
   maintaining the ratio of the difference in amplitudes between said first upper and second lower levels to the difference in said first and second signal values representing said first and second quiescent frequencies constant, and
   maintaining the difference between a signal value representing one of said quiescent frequencies and one of said upper or lower levels at a level which produces a frequency difference after modulating said oscillator proportional to the frequency difference between one quiescent frequency and one of said extreme frequency limits.

2. A method as claimed in claim 1, in which the modulating signal is subsequently amplified with a controllable gain before it is applied to a modulation input terminal of the oscillator.

3. An circuit as claimed in claim 2, the first, second and third resistors are in series with each other and with a current source.

4. A circuit for producing a modulating signal for frequency modulating an oscillator to produce a S.E.C.A.M. colour television signal comprising:
   a common source of multiple voltages including first, second, third and fourth voltage levels, the difference in said first and fourth voltage levels identifying the difference in first and second extreme frequency limits for said oscillator;
   said second and third voltage levels identifying first and second quiescent frequencies for said S.E.C.A.M. colour television signal, the ratio of the difference between said second and third voltage levels and the difference between said first and fourth levels, and the ratio of the difference of said first and fourth levels and the difference between said third and fourth levels being constant;
   means for combining said second level with one line of a colour difference signal and said third level to another line of two line-sequential colour difference signals; and
   an amplitude limiter circuit receiving a signal from said means for combining and limiting said received signal to a level between said first and fourth levels, whereby a modulating signal is produced modulating said oscillator within said frequency limits and having first and second quiescent frequencies, the ratio of the frequency difference between said limits and the differences between said quiescent frequencies being constant.

5. The circuit of claim 4 wherein said common source comprises a series circuit of at least first, second and third resistors connected to a common voltage source.

6. The circuit of claim 5 wherein said means for combining comprises:
   first and second differential amplifiers having common outputs, a common signal input and separate reference inputs, said reference inputs connected to receive said second and third voltage levels, said amplifiers being alternately switched to provide an output signal; and
   wherein said limiter circuit includes first and second limiters for limiting said first and second differential amplifiers common outputs voltage to said first and fourth voltage levels.

7. The circuit of claim 4 further comprising a gain controlled amplifier connected to transmit said modulating signal to a frequency modulating input of said oscillator.

* * * * *